United States Patent
Wang

(10) Patent No.: US 7,202,981 B2
(45) Date of Patent: *Apr. 10, 2007

(54) METHOD AND SYSTEM FOR INCREASING SCANNING SPEED

(76) Inventor: Kuo-Jeng Wang, 14, Kung-An St., Hsiao-Kang, Kaohsiung (TW)

(*) Notice: Subject to any disclaimer, the term of this patent is extended or adjusted under 35 U.S.C. 154(b) by 915 days.

This patent is subject to a terminal disclaimer.

(21) Appl. No.: 09/985,057

(22) Filed: Nov. 1, 2001

(65) Prior Publication Data

US 2003/0081143 A1  May 1, 2003

(51) Int. Cl.
*H04N 1/04* (2006.01)
*H04N 1/36* (2006.01)
*H04N 1/32* (2006.01)

(52) U.S. Cl. .......... 358/486; 358/474; 358/409; 358/412; 358/442; 358/445; 358/468; 358/482; 358/483

(58) Field of Classification Search ........... 358/409, 358/412, 442, 474, 404, 444, 486, 445, 468, 358/405, 483, 482, 434, 1.15; 382/312, 318, 382/319
See application file for complete search history.

(56) References Cited

U.S. PATENT DOCUMENTS 5,943,139 A * 8/1999 Tang et al. ............ 358/412
6,160,636 A * 12/2000 Nagano et al. ......... 358/412
6,262,816 B1 * 7/2001 Rindsig et al. ......... 358/498
6,388,777 B1 * 5/2002 Miyajima ............... 358/486
6,462,842 B1 * 10/2002 Hamilton ............... 358/486
2003/0107779 A1 * 6/2003 Chen et al. ............ 358/486

* cited by examiner

*Primary Examiner*—Cheukfan Lee
(74) *Attorney, Agent, or Firm*—Berkeley Law & Technology Group, LLP

(57) ABSTRACT

A method and a system for increasing scanning speed are provided. The method may include determining a transmission rate of a transit interface, scanning an original to generate an image data, and adjusting a cycle time of the image data to change a data generating rate responsive to the transmission rate of the transit interface. One aspect of the present disclosure may be by adjusting the cycle time of a state machine to change the data generating rate corresponding to the transmission rate of the transit interface. Therefore, in response to the transmission rate of the transit interface, the cycle time of the state machine may be adjusted to produce the data at a rate that prevents the smearing process. Thus, the possibility of memory buffer full may be reduced, which may lead to the reduction in start-stop processes and therefore the overall scanning speed may be increased without necessarily requiring the increase in size of a memory buffer.

18 Claims, 3 Drawing Sheets

METHOD AND SYSTEM FOR INCREASING SCANNING SPEED

BACKGROUND

Scanners may be widely applied for the ability of generating digital representation of the information comprised by an original. The digital representation may be processed on a host device such as computer, and through an I/O cable data may be transmitted from the scanner to the computer. The data transmission rate from the scanner to the host device may depend on the communication protocol used between the scanner and the host device. Ideally, digital data transferred to the host device may be produced at the same rate that the host device can accept it. Therefore, no memory buffer may be required for accumulating data that may be waiting for transfer. However, the digital data may be produced at a rate quite different from the data reception rate of the host device. If the transmission rate is higher than the data generating rate of the scanner, the scanner may run at full speed with no possible loss of data. However, the data generating rate of a scanner may be faster than the transmission rate of the host computer. Therefore, when the transmission rate is lower than the data generating rate, issues related to the efficiency of the scanning operation may arise in the scanning operation.

Besides optical resolution, the scanning speed may be another functional aspect of scanners. The scanning speed may be the time that the scanner sends back scanned image to the host device after the scanning work is started. If the transmission rate is slower, the image data may be accumulated in a memory buffer, and the memory buffer may finally get full after only a portion of the original is scanned. In order to prevent the loss of the image data, the scanning operation may be halted when the memory buffer is full and, then resumed when the memory buffer is empty or available for storing more data again. In other words, when the memory buffer is full, a scanning module driven by a motor may be stopped and moved backward for a predetermined number of steps, due to the first few step motions of the scanning module being usually quite shaky and unstable that may be caused by mechanical vibrations resulting in affecting the quality of the output in that period. Then, the scanning module may be forwarded from there when the data accumulated in the memory buffer is transmitted to the host device. The processes of stopping and restarting the scan are alternatively performed until the scanning operation is completed. This method of preventing the loss of image data may be useful, but it may cause the scanning of an original to take a long time because the scanning may be stopped and restarted repeatedly.

The procedure of moving the scanning module backward and forward or, in other words, the procedure of stopping and restarting the scanning module may be called a smearing or the start-stop process. This procedure might help to solve the problem of unstable scanning module or memory buffer full but it may take time to move the scanning module backward and forward, which may reduce the overall scanning speed of the scanner. Besides the start-stop process, in order to overcome the problems associated with data transfer from the scanner to the computer due to the varying transmission rate of the computer, many methods may have been proposed. The increase in size of the memory buffer may be one of the methods. The scanning of the original may not be affected by the varying capability of the computer to receive data. Enlarging memory buffer may be quite straight forward and easy but with some drawbacks, that is, it may also increase cost and complicate the manufacture of a scanner. Moreover, it may not really solve the problem when a high-resolution scan is performed, which can generate a huge amount of image data within a very short period of time, and it may not be feasible to simply increase the memory buffer size to alleviate the problem.

A scanner with fast scanning speed may shorten the time while scanning of an original, and speed up and increase work efficiency. Thus, it may be helpful to develop a method and a system which may reduce the possibility of memory buffer being full, which may lead to the reduction of the time wasted on start-stop processes and thereby promoting the scanning speed without necessarily requiring the increase in size of a memory buffer.

SUMMARY

The present disclosure is directed to a method and a system for increasing the scanning speed. One aspect of the present method and system relates to adjusting the cycle time of a state machine to change the data generating rate corresponding to the transmission rate of the transit interface. Therefore, in response to the transmission rate of the transit interface, the cycle time of the state machine is adjusted to produce the data at a rate that prevents the smearing process. Thus, the possibility of memory buffer full may be reduced leading to the reduction in the time wasted on start-stop processes and therefore the overall scanning speed may be increased without necessarily requiring the increase in size of a memory buffer.

In accordance with disclosed embodiments, a method is provided for optimizing the scanning speed of a scanning system by adjusting a cycle time of a state machine in response to a transit interface. The method comprises determining a transmission rate of the transit interface, scanning an original to generate an image data, and adjusting a cycle time of the image data to change a data generating rate responsive to the transmission rate of the transit interface. The data generating rate may be any rate that reduces the data accumulation. The adjusting the cycle time of the image data comprises selecting a corresponding cycle time from a plurality of predetermined values based at least in part upon the transmission rate. The method further comprises communicating the image data from the scanning system to a host device through the transit interface.

In another embodiment, a method of optimizing scanning speed comprises determining a transmission rate of a transit interface, comparing the transmission rate with a predetermined value to obtain a result, scanning an original to generate an image data, and adjusting a cycle time of the image data to change a data generating rate according to the result. When the transmission rate is faster than the predetermined value, the cycle time of the image data is decreased to increase the data generating rate. When the transmission rate is lower than the predetermined value, the cycle time is increased to reduce the data generating rate. The method further comprises communicating the image data from the scanning system to a host device through the transit interface.

In a third embodiment, a scanning system with adjustable data generating rate comprises a plurality of transit interfaces for data communicating between the scanning system and a host device, a state machine generator for generating a plurality of corresponding cycle times responsive to the transit interfaces, and a scanning module for scanning an original to generate the data at a rate controlled by the corresponding cycle times. The transit interface can be USB1.1, USB2.0, IEEE1394, EPP, and SCSI, but not limited to those. When a transit interface with different transmission rates such as USB (USB1.1, USB2.0) and IEEE1394 (1394a, 1394b) series, the state machine generator generates the corresponding cycle times according to the transmission rates.

BRIEF DESCRIPTION OF THE DRAWINGS

The foregoing aspects and many of the attendant advantages will become more readily appreciated as the same becomes better understood by reference to the following detailed description, when taken in conjunction with the accompanying drawings, wherein.

DESCRIPTION OF THE PREFERRED EMBODIMENT

Some sample embodiments will now be described in greater detail. Nevertheless, it should be noted that the subject of the present disclosure can be practiced in a wide range of other embodiments besides those explicitly described, and the scope of the present disclosure is expressly not limited except as specified in the accompanying claims.

A state machine is a logical hardware representation of a flow chart in which the transitions from one state to the succeeding state is defined to complete a task in a cycle time. For example, the digital data produced by a scanner is usually generated at a fixed rate due to the implement of a state machine with a fixed cycle time, such as 10 clocks in a cycle. Therefore, the fixed data generating rate does not serve to optimize the scanning speed in response to the difference in transmission rate of a variety of transit interfaces. In other words, when the image data is generated at a rate faster than the transmission rate of a transit interface, or when a huge amount of the image data is generated within a very short time causing a memory buffer full, the start-stop process is unavoidable such that the time wasting on the start-stop process is also inevitable. When the cycle time is too short incorporated with slower transmission rate, more start-stop processes are likely to occur resulting in the delay of the scanning speed. When the cycle time is too long, the overall scanning speed is delayed due to the increased idle time of the transit interface with a faster transmission rate. Therefore, the optimization of the scanning speed is difficult. Provided is a method and a system for adjusting the cycle time of the state machine corresponding to the transit interface to generate the image data at a rate for avoiding the start-stop processes and optimizing the scanning speed.

One aspect of the embodiments is that due to the difference in transmission rate, the data is generated at a rate corresponding to the transmission rate of the transit interface to reduce the possibility of start-stop processes, that is, to prevent a memory buffer full. Other aspect of the embodiments may be the approach of balancing of the cycle time of the state machine and the data generating rate, thus, the data generating rate is changed by means of adjusting the cycle time of the state machine to optimize the overall scanning speed.

Figure 1:
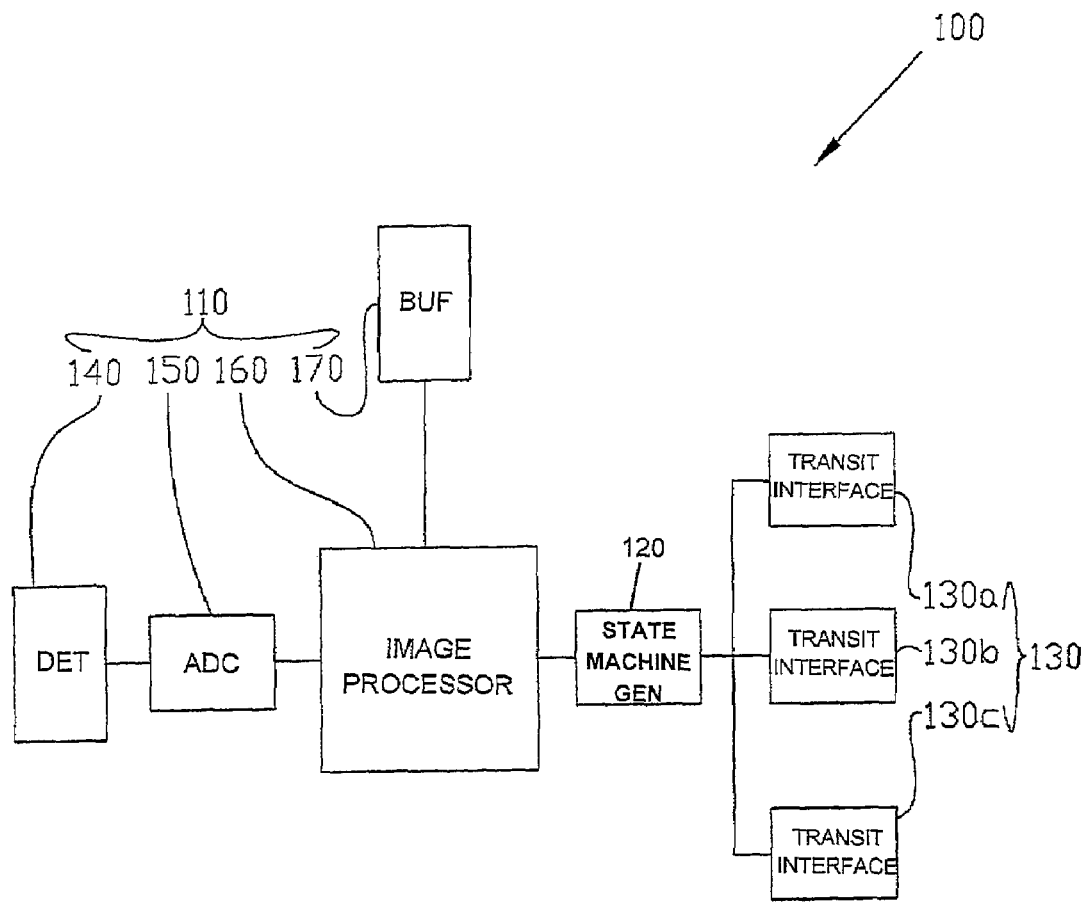
FIG. 1 is a schematic block diagram of a scanning system in accordance with an embodiment of the subject matter disclosed herein.

Referring to FIG. 1, in one embodiment, a schematic block diagram of a scanning system 100 is shown. The scanning system 100 comprises a scanning module 110, a state machine generator 120, and a plurality of transit interfaces 130 such as transit interfaces 130a, 130b, and 130c. The scanning module 110 comprises a detector 140, an analog to digital converter (ADC) 150, an image processor 160, and a data memory buffer 170, is for scanning an original to generate and image data. The transit interface 130 is for the data communication from a data generator to a host device, in the embodiment, transferring the image data from the scanning system 100 to a computer. The transit interface can be any commercial product with any communication protocols and transmission rates such as USB1.1, USB2.0, IEEE1394, EPP, and SCSI, but is not limited in this respect. The state machine generator 120 is a logical hardware representation of a flow chart, which generates corresponding cycle times to change a data generating rate according to the transit interfaces. The adjustment of the cycle time makes changes the data generating rate to prevent the memory buffer 170 full. In short, the state machine generator 120 has corresponding cycle times based at least in part on the transit interface or the transmission rate of the transit interface. Therefore, the scanning system 110 generates the image data and under the control of a generated cycle time to change the data generating rate due at least in part to the change of the cycle time of the image.

Figure 2A:
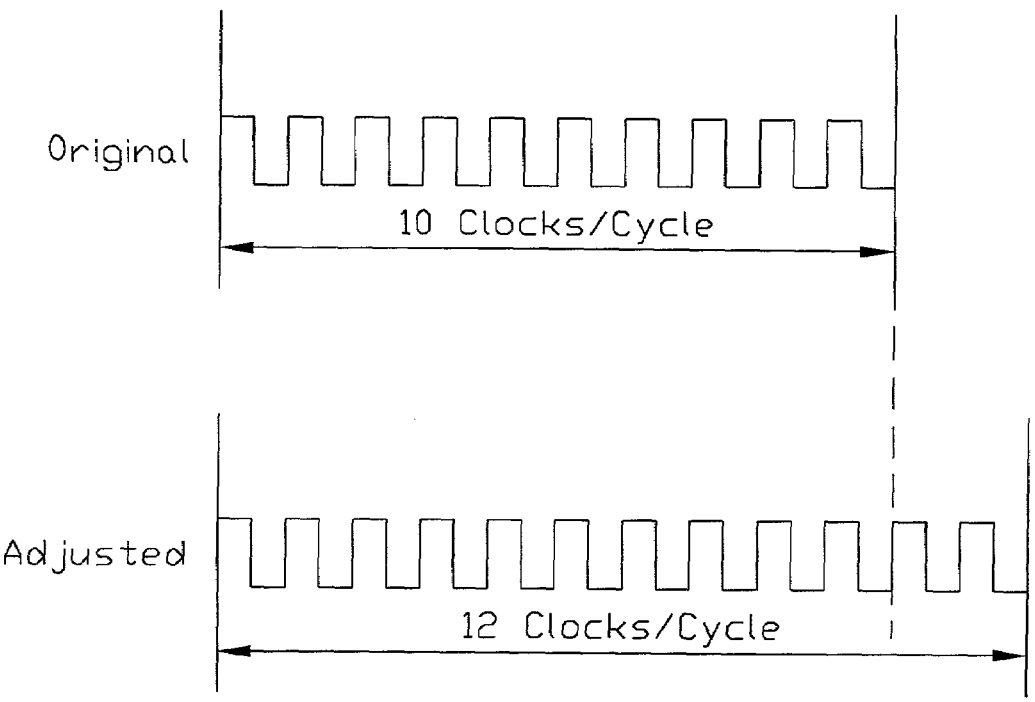
FIGS. 2A to 2B is a schematic illustration of increasing and decreasing the clock count in one cycle in accordance with an embodiment of the subject matter disclosed herein, respectively.
Figure 2B:
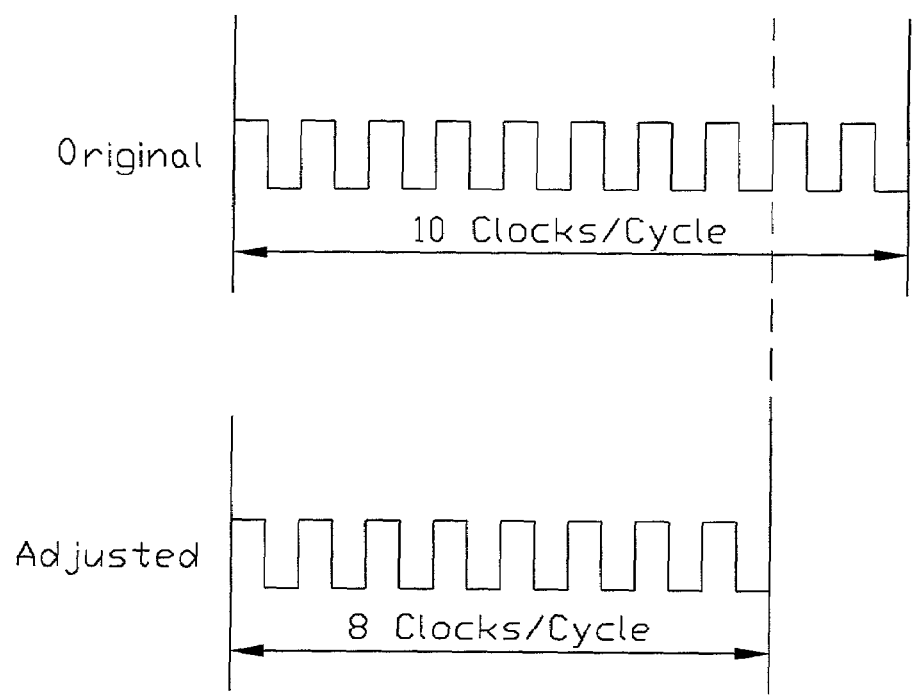

Additionally, the cycle time of the state machine can be determined by selecting from a plurality of built-in cycle times of the state machine based at least in part on the transmission rate. In other words, every transit interface has a corresponding cycle time of the state machine built in the scanning system. When the transit interface is determined, the scanning module 110 is controlled by the corresponding cycle time of the state machine to generate the image data. For example, if the transit interface has a slower transmission rate such as USB1.1, the cycle time of the state machine is increased, that is a cycle time of 10 clocks in one cycle may be increased to a cycle time with 12 clocks in one cycle as shown in FIG. 2A. On the other hand, when the transit interface with a faster transmission rate such as IEEE1394, the cycle time of the state machine is decreased, that is a cycle time of 10 clocks in one cycle may be reduced to a cycle time with 8 clocks in one cycle to reduce the idle time, as shown in FIG. 2B. Thus, the possibility of the memory buffer full may be reduced and the start-stop process may be reduced, which may result in an increase in scanning speed.

Figure 3A:
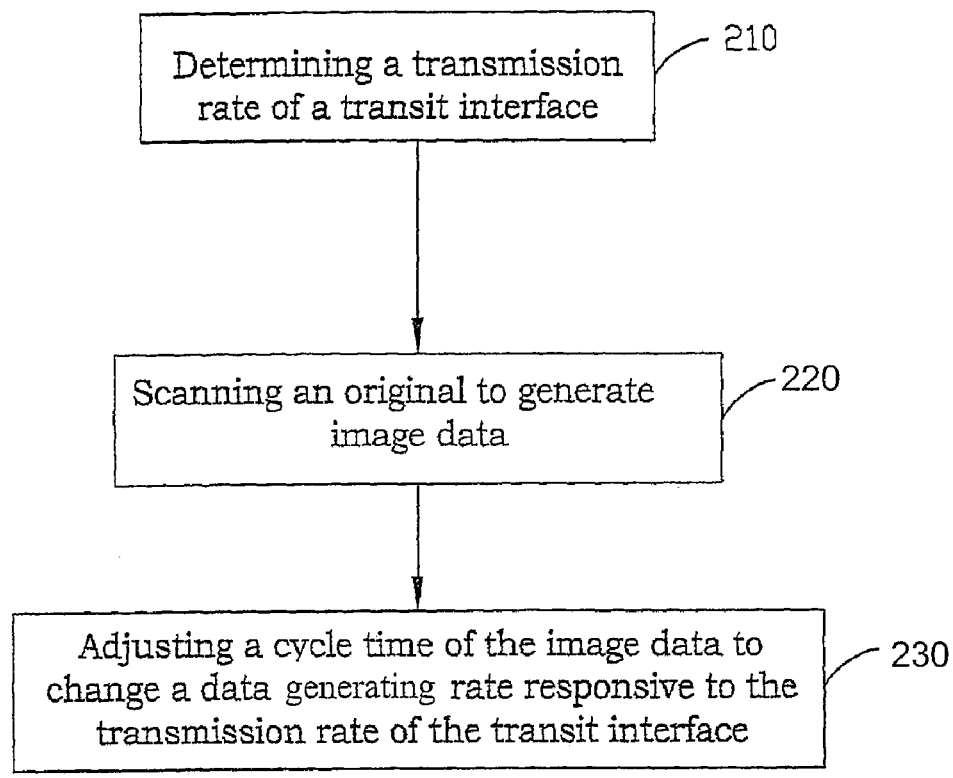
FIG. 3A is a flow diagram of a scanning method in accordance with one embodiment of the subject matter disclosed herein.

A method for adjusting a cycle time of a state machine according to the transit interface is also provided, which may increase the scanning speed. Referring to FIG. 3A, a flow chart of a scanning system is illustrated. The method starts at step 210, the transit interface used in the scanning process is determined such as the transit interface 130a is implemented. It is noted that when the transit interface is determined, the transmission rate can also be determined. For example the transit interface can be a USB 2.0 with a transmission rate of 480 Mbit/sec or running at a rate of 12 Mbit/sec, or a USB1.1 with a transmission rate of 12 Mbit/sec. The transmission rate of the transit interface can be determined by a signal sent to the scanning system in the process of initializing the scanning system or by a firmware prior to starting a scanning operation.

At step 220, an original is scanned to generate an image data. At step 230, by changing state machine's cycle time, a cycle time of the image data is adjusted to change a data generating rate according to the transit interface. That is, the scanning module scans the original to generate the image data and the data generating rate may be changed to prevent the memory buffer full. The cycle time of the state machine is determined at least in part by changing the clock count in one cycle responsive to the transmission rate of the transit interface. For example, the USB transit interface can have three transmission rates, high-speed of 480 Mbit/sec, full-speed of 12 Mbit/sec, and low-speed which is seldom used for data transfer. The cycle time (or the clock count in one cycle) of the state machine is determined when the transmission rate is determined. If the transit interface has a high transmission rate such as IEEE 1394, EPP, and SCSI, the data is generated at the shortest cycle time to complete a task required, which may reduce the idle time due to the transmission rate may be greatly faster than the data generating rate in the present technology. When the transit interface has a low transmission rate such as USB1.1, the data generating rate is operated at a longer cycle time to prevent the memory buffer full.

Figure 3B:
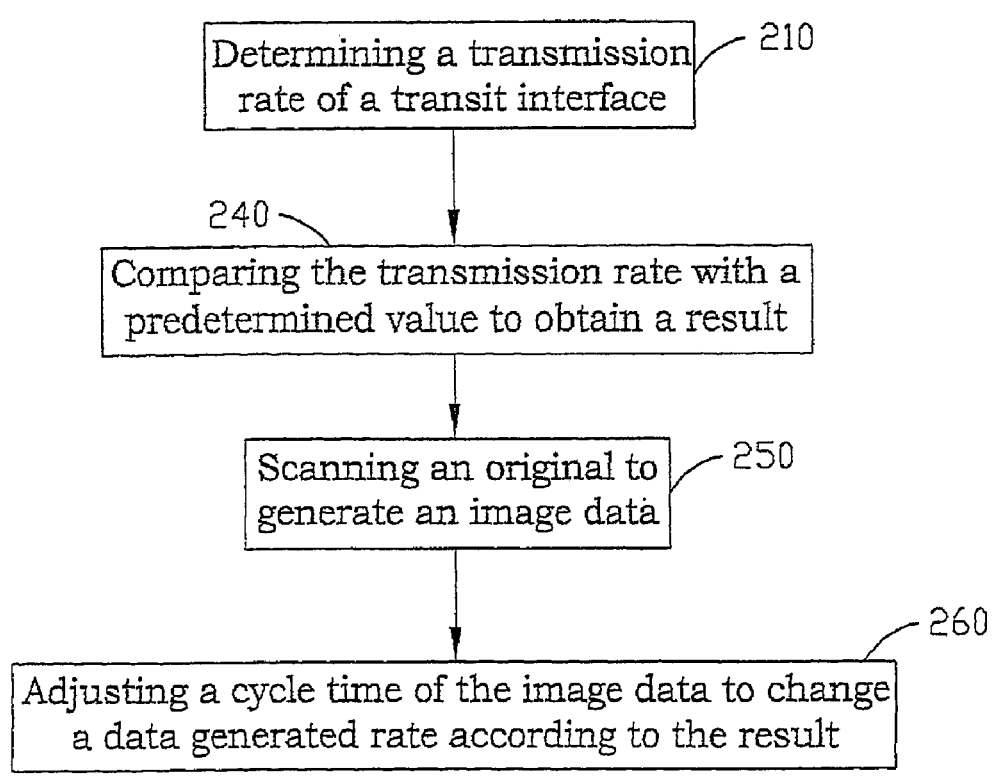
FIG. 3B is a flow diagram of a scanning method in accordance with an embodiment of the subject matter disclosed herein.

Additionally, FIG. 3B shows a flow diagram of increasing the scanning speed in accordance with another embodiment. The method starts from step 210, the transit interface used in the scanning process is determined such as the transit interface 130a may be implemented. At step 240, by comparing the transmission rate of the transit interface with a predetermined transmission rate, a result is obtained. Then, an original is scanned to generate an image data at step 250. Based at least in part upon the result obtained in step 240, the determination of adjusting a cycle of a state machine is made to adjust the cycle time of the image data to change a data generating rate at step 260. When the transmission rate of the transit interface is faster than the predetermined transmission rate, the cycle time of the state machine may be decreased to increase the data generating rate. If the transmission rate of the transit interface is lower than the predetermined transmission rate, the cycle time of the state machine may be increased to reduce the data generating rate.

In the scanning procedure, the transmission rate of a transit interface 130 such as USB1.1 is first determined. When an optical detector 140 such as charge coupled device (CCD) generates analog image data in the scanning of the original, the analog to digital converter (ADC) 150 is for converting the analog image data to digital data. Then, the image processor 160 of the scanning module 110 generates the image data based at least in part upon a cycle time to change a data generating rate. The corresponding cycle time is selected from a plurality of built-in cycle times according to the transmission rate of the transit interface. Therefore, the approach of balancing the transmission rate and the data generating rate may lead to the change of the data generating rate preventing the memory buffer 170 full, which may result in the reduction in the time wasted on the start-stop process. Thus, the scanning speed may be increased without necessarily increasing the memory buffer size.

Although specific embodiments have been illustrated and described, it will be obvious to those skilled in the art that various modifications may be made without departing from what is intended to be limited solely by the appended claims.

What is claimed is:

1. A method for optimizing scanning speed of a scanning system, comprising:
determining a plurality of transmission rates of a plurality of transit interfaces;
scanning an original to generate image data; and
adjusting a cycle time of the image data to change a data generating rate responsive to one of said transmission rates of said transit interfaces.

2. The method according to claim 1, further comprising communicating said image data from said scanning system to a host device through said transit interface.

3. The method according to claim 1, wherein said determining said transmission rates comprises determining said transmission rates by a firmware.

4. The method according to claim 1, wherein said transit interfaces are one of USB1.1, a USB2.0, an IEEE1394, an EPP, and a SCSI, or combinations thereof.

5. The method according to claim 1, wherein said data generated rate is any rate reducing accumulation of said data.

6. The method according to claim 1, wherein said adjusting said cycle time of said image data comprises adjusting a clock count comprised in one cycle according to said transmission rate.

7. The method according to claim 1, wherein said adjusting said cycle time of said image data comprises selecting a corresponding cycle time from a plurality of predetermined cycle times.

8. A method of promoting scanning speed of a scanning system, comprising:
determining a plurality of transmission rates of a plurality of transit interfaces;
comparing one of said transmission rates with a predetermined value to obtain a result;
scanning an original to generate image data; and
adjusting a cycle time of said image data to change a data generating rate based at least in part upon said result.

9. The method according to claim 8, further comprising communicating said image data from said scanning system to a host device through said transit interfaces.

10. The method according to claim 8, wherein said determining said transmission rates comprises determining said transmission rates by a firmware.

11. The method according to claim 8, wherein said transit interfaces are one of USB1.1, USB2.0, IEEE1394, EPP, and SCSI, or combinations thereof.

12. The method according to claim 8, wherein said adjusting a cycle time of said image data comprises decreasing said cycle time of said image data to increase said data generated rate when said transmission rates is faster than said predetermined value.

13. The method according to claim 8, wherein said adjusting a cycle time of said image data comprises increasing said cycle time of said image data to reduce said data generated rate when said transmission rates is lower than said predetermined value.

14. The method according to claim 8, wherein said adjusting a cycle time of said image data comprises adjusting a clock count comprised in one cycle.

15. A scanning system with adjustable data generating rate; comprising:
a plurality of transit interfaces capable of communicating data between said scanning system and a host device;
a state machine generator capable of generating a plurality of corresponding cycle times of a state machine responsive to said transit interfaces; and a scanning module capable of scanning an original to generate said data at a rate controlled at least in part by said corresponding cycle times of said state machine.

16. The system according to claim 15, wherein said transit interface is one of USB1.1, USB2.0, IEEE1394, EPP, and SCSI, or combinations thereof.

17. The system according to claim 15, wherein said transit interfaces comprise a plurality of transmission rates, said state machine is further capable of generating said corresponding cycle times based at east in part upon said transmission rates.

18. The system according to claim 17, wherein said one of said transit interfaces is one of USB, IEEE1394 transit interfaces, and combinations thereof.

* * * * *

UNITED STATES PATENT AND TRADEMARK OFFICE
CERTIFICATE OF CORRECTION

| | | |
|---|---|---|
| PATENT NO. | : 7,202,981 B2 | Page 1 of 1 |
| APPLICATION NO. | : 09/985057 | |
| DATED | : April 10, 2007 | |
| INVENTOR(S) | : Wang | |

It is certified that error appears in the above-identified patent and that said Letters Patent is hereby corrected as shown below:

At column 8, line 7, please replace "at east in" with --at least in--.

Signed and Sealed this

Twenty-seventh Day of July, 2010

David J. Kappos
*Director of the United States Patent and Trademark Office*